United States Patent [19]

Komoto et al.

[11] Patent Number: 4,587,853
[45] Date of Patent: May 13, 1986

[54] VIBRATION TYPE FORCE DETECTOR

[75] Inventors: Akira Komoto, Otsu; Akira Nishio, Nagaokakyo, both of Japan

[73] Assignee: Shimadzu Corporation, Kyoto, Japan

[21] Appl. No.: 673,666

[22] Filed: Nov. 21, 1984

[30] Foreign Application Priority Data

Dec. 14, 1983 [JP] Japan .................................. 58-236751

[51] Int. Cl.$^4$ .............................................. G01L 1/10
[52] U.S. Cl. ........................... 73/862.59; 177/210 FP
[58] Field of Search ........... 73/DIG. 1, 517 AV, 704, 73/778, 862.59; 177/210 FP

[56] References Cited

U.S. PATENT DOCUMENTS

| | | | |
|---|---|---|---|
| 2,968,943 | 1/1961 | Statham | 73/DIG. 1 |
| 3,470,400 | 9/1969 | Weisbord | 73/DIG. 1 |
| 3,529,470 | 9/1970 | Agar | 73/862.59 |
| 4,299,122 | 11/1981 | Ueda et al. | 73/DIG. 1 |

FOREIGN PATENT DOCUMENTS

| | | | |
|---|---|---|---|
| 0823847 | 11/1959 | United Kingdom | 73/DIG. 1 |
| 0559136 | 5/1977 | U.S.S.R. | 73/DIG. 1 |
| 0977959 | 11/1982 | U.S.S.R. | 73/862.59 |

OTHER PUBLICATIONS

Bouts et al., Technisches Messen atm, H4 (Apr. 1977), vol. 44, pp. 125-130.

Primary Examiner—Charles A. Ruehl
Attorney, Agent, or Firm—Koda and Androlia

[57] ABSTRACT

A vibration type force detector in which the vibration string is made of a platinum-based nickel-containing alloy. The magnitude of a force to be detected is obtained through the measurement of a natural vibration frequency of a string vibrating with the force loaded thereto. However, the force detector using a Pt-Ni alloy vibration string based on the invention makes it possible, for the first time, to apply a vibrational type force detector to a precision measurement of force or weight. Measurement with an accuracy of $10^{-5}$ is made possible by the present invention.

2 Claims, 11 Drawing Figures

FIG. 7
FIG. 8
FIG. 9
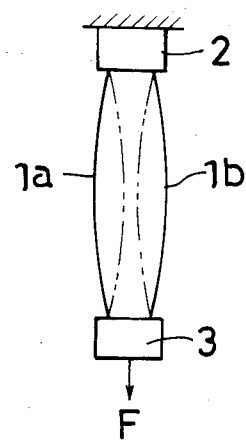
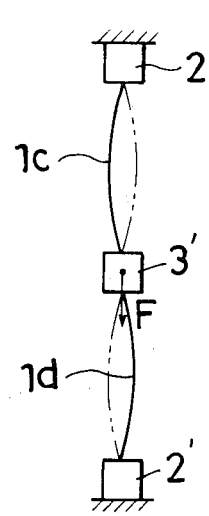
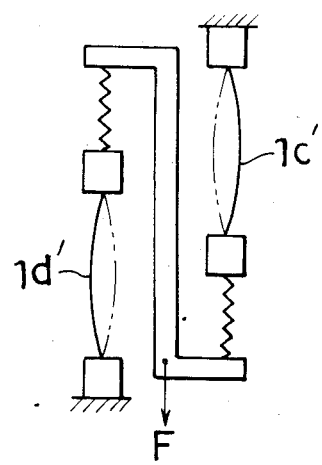
FIG. 10
FIG. 11
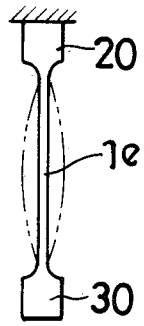
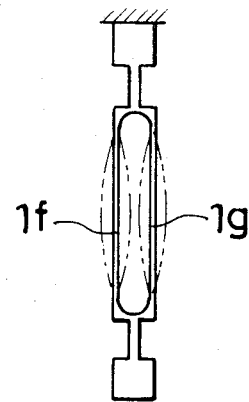

VIBRATION TYPE FORCE DETECTOR

BACKGROUND OF THE INVENTION

1. Field of the Invention

The present invention relates to a vibration type force detector, and more particularly to a force detector for detecting force through measuring the natural vibration frequency of a string loaded with a force in the direction of pulling the string.

2. Prior Art

It is well known that the natural vibration frequency of a string stretched with both the ends fixed depends on the tension and linear density of the string. This phenomenon can be used for the detection and measurement of force by making a string vibrate with its tension given by an unknown force to be measured. The natural vibration frequency of the string is proportional to the root of the tension, which is directly proportional to the force to be measured. The force can therefore be obtained as a value proportional to the square of the vibration frequency.

Vibration type force detectors devised in accordance with the above principle have been manufactured and used widely. However, the conventional detectors of this type have an important disadvantage that they can not be applied to a precision measurement of force or weight, because the string takes a long time to come to vibrate precisely at its intrinsic natural frequency after having been loaded with a force or weight to be measured.

In general, an exact response of the vibration frequency to a force or weight takes 3 to 30 minutes, depending on the material used for the vibrating string and on the method of fixing the ends of the string. This slow response causes such undesirable results as a creep, hysterisis and zero-point drift of a value to be measured. Therefore, the accuracy of conventional vibration type force detectors remains at relatively low values of 1/5000 to 1/20000.

OBJECTS AND SUMMARY OF THE INVENTION

An object of the present invention is to provide a high-precision vibration type force detector substantially free from a creep, hysterisis and zero-point drift of the value to be measured.

Another object of the present invention is to constitute such a high-precision vibration type force detector to be anticorrosive and excellent in durability.

For the achievement of these objects the vibration string used in the present invention is made of a platinum-based alloy containing nickel. The string is stretched between a fixed base point and a movable point to which a force to be measured is loaded in such a direction as to pull the string, while a static-magnetic field is applied to the string orthogonally to both the length-direction and vibrational direction of the string. A vibration of the string thus causes a vibrating voltage to be developed on the string in accordance with Fleming's right-hand law. Therefore, by inputting this vibrating voltage to a positive-feedback amplifier, the amplifier constitutes an oscillation circuit together with the string, to make the string continue a vibration at the frequency proportional to the root of the tension produced in the string by the force pulling the string. The string serves as a resonator in the circuit. The value of the force is obtained through the measurement of the oscillation frequency of the circuit.

BRIEF DESCRIPTION OF THE DRAWINGS

The present invention is further described in detail with reference to the accompanying drawings, in which:

FIGS. 7 to 11 show modifications of the vibration string usable in the above embodiment.

DETAILED DESCRIPTION OF THE INVENTION

Figure 1:
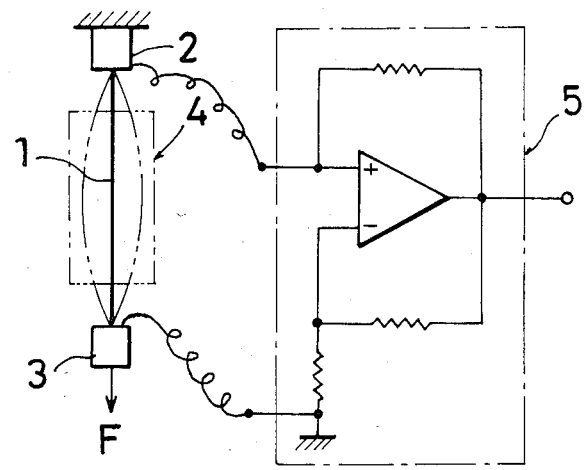
FIG. 1 shows a scheme for explaining the principle of the present invention.

Referring to FIG. 1, which illustrates the principle of a vibration type force detector, a vibration string 1 is stretched between a fixed base 2 and a force-loading point 3 to which a force F is loaded in the direction of pulling the string 1. The string 1, which is made of a conductor, is subjected to a static-magnetic field applied perpendicularly to the string. A rectangular enclosure 4 shown with a double-dotted chain line in the figure shows the area where the magnetic field is applied. A vibration of the string in the magnetic field causes a vibrating voltage to develop across the string. The voltage is inputted to a positive-feedback amplifier 5, which constitutes an oscillator circuit together with the vibration string 1. In this case the vibration string 1 plays a role of the resonator of the oscillator circuit. Thus, the string 1 continues vibration at a natural frequency proportional to its tension given by the force F. The vibrational frequency can be detected by measuring the frequency of the output signal from the amplifier 5. The magnitude of the force F is obtained as a value proportional to the square of the measured frequency.

Figure 2:
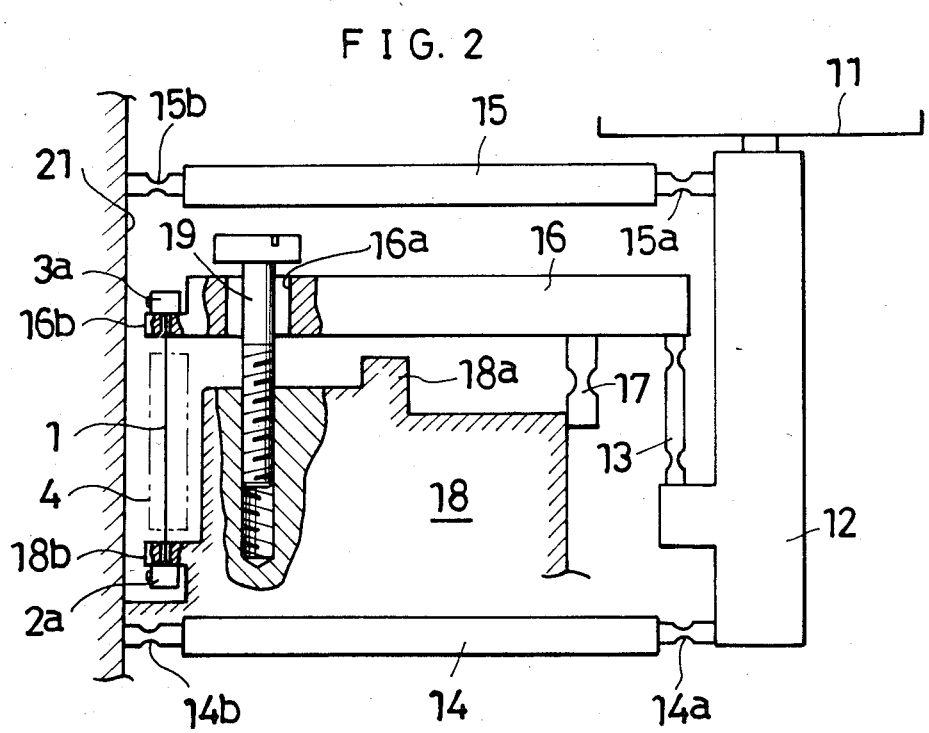
FIG. 2 shows a mechanical constitution of an embodiment of the present invention.

An embodiment of the present invention, which is based on the above principle, is described in the following in reference to FIGS. 2, 3, 4 and 5. In FIG. 2, which shows a mechanical arrangement of the embodiment, a tray support 12 supporting a weighing tray 11 is kept vertical by two parallel arms 14 and 15 having their end portions formed as flexible joints 14a, 14b, 15a and 15b and extending from a base wall 21. The tray support 12, the two parallel arms 14 and 15 with the flexible joints 14a, 14b, 15a and 15b constitute a Roberval mechanism. A weight loaded on the weighing tray 11 is transmitted to a lever 16 through a connecting rod 13 having flexible joints. The lever 16 is supported by a flexible fulcum 17. Between one end 16b of the lever 16 and a horizontal projection 18b of a base 18 of the apparatus there is stretched a vibration string 1 by use of string fixing means 3a and 2a, the former being electrically in contact with the lever 16, and the latter being electrically insulated from the base 18. The details of the string fixing means 2a and 3a will be described later in reference to FIGS. 3, 4 and 5. The vibration string 1 is, therefore, given a tension by a force proportional to the weight loaded on the weighing tray 11. In addition the vibration string 1, which is in the form of a thin strip in this embodiment, is subjected to a static-magnetic field applied in the direction orthogonal to both the length and thickness directions of the strip-shaped vibration string 1. A rectangular region 4 enclosed by a double-dotted chain line shows the area in which the static-magnetic field is applied. The vibration string 1 and a positive-feedback amplifier (not shown in the figure) constitute, as similarly as shown in FIG. 1, an oscillation circuit to oscillate at the natural vibration frequency of the string 1 loaded with a force proportional to the weight on the tray 11. The wiring from the string 1 to the amplifier is omitted in the figure. A bolt 19 screwed into the base 18 through a hole 16a of the lever 16 is a clamp means to be used, for instance, for the transportation of the apparatus. The lever 16 can be clamped by tightening the bolt 19 until the lever 16 tilts and gets into touch with an elevation 18a of the base 18.

Figure 4:
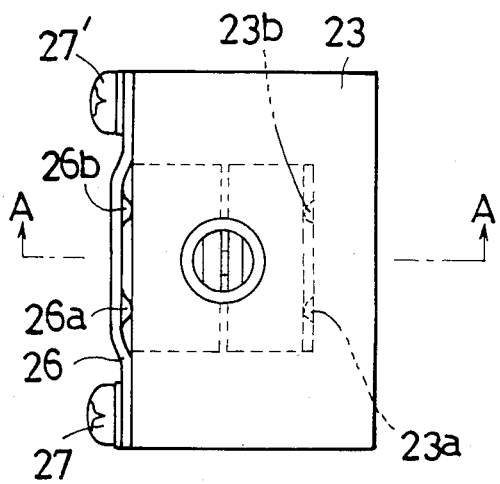
FIG. 4 shows a plan view of the above string-fixing means.
Figure 5:
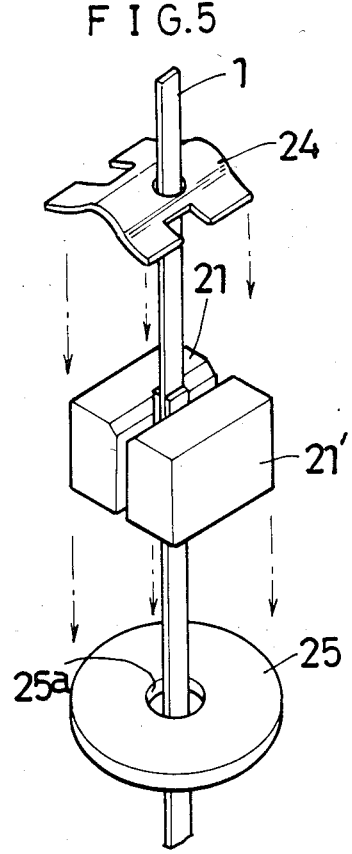
FIG. 5 shows a perspective exploded-view of the above string-fixing means.
Figure 3:
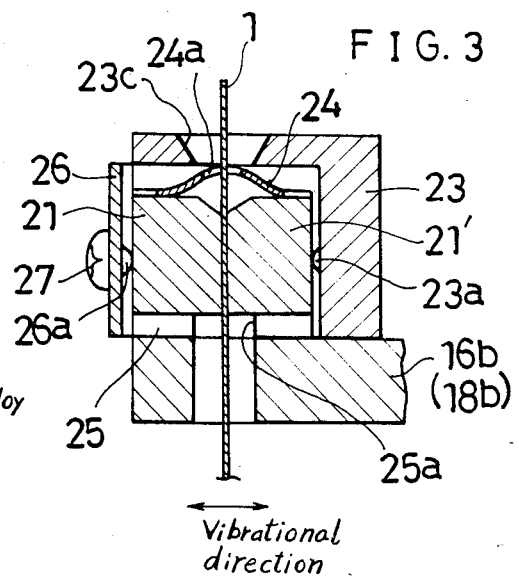
FIG. 3 shows a cross-sectional view of the string-fixing means used in the embodiment shown in FIG. 2.

The details of the string fixing means 3a and 2a are illustrated in FIGS. 3, 4 and 5 showing a cross-sectional view, a plan view and a perspective exploded-view, respectively, of the fixing means. The cross-sectional view in FIG. 3 is taken along the line A—A in FIG. 4. Referring to FIG. 3 (and FIG. 4) the strip-shaped vibration string 1 is squeezed between two clamping pieces 21 and 21'. The clamping pieces 21 and 21', which are encased in a box type casing 23, are pushed vertically by a spring 24 onto a base disc 25 having a through hole 25a at the center, and kept fixed horizontally by a spring lid 26 with attached bumps 26a and 26b kept in contact with the clamping piece 21. The clamping piece 21' is stopped by bumps 23a and 23b provided on the inner wall of the casing 23. The spring lid 26 is secured to the casing 26 with bolts 27 and 27'. Through holes 24a and 23c provided respectively to the spring 24 and to the casing 23 are to make the tail portion of the string 1 penetrate therethrough. The thus constituted string fixing means 3a and 2a are mounted respectively on the upper surface of the end portion 16b of the lever 16 (FIG. 2) and on the lower surface of the projection 18b of the base 18 (FIG. 2). The assemble of the elements in the casing 23 is illustrated by the perspective exploded-view shown in FIG. 5.

In the above described constitution of this embodiment, the strip-shaped vibration string 1 is made of an alloy of platinum 92.5% and nickel 7.5%.

Figure 6:
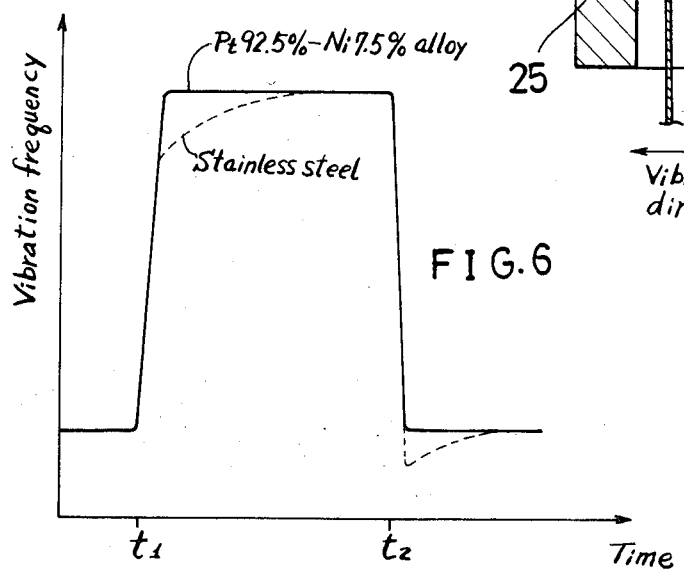
FIG. 6 shows a graph for explaining the function of the above embodiment.

The performance of this embodiment with the vibration string made of a platinum alloy is compared, in FIG. 6, with that of a conventional vibration type force detector having the same constitution except for the vibration string made of a stainless steel for spring. FIG. 6 gives a graphical representation of the vibration frequency response of the string to a change in the force applied to the string. The ordinate of the graph stands for the vibration frequency and the abscissa for the time. On the time axis, $t_1$ indicates the time at which the force applied to the string was increased in addition to an original value, while $t_2$ indicates the time at which the force was returned to the original value. As is made clear by the graph, the vibration frequency in this embodiment (solid line) rapidly follows a change in the applied force, while that in the conventional force detector (dotted line) takes a long time to become stable, showing a creep phenomenon and a hysteresis in response to an increasing force and a decreasing force, respectively. In order to quantitatively show the difference in the creep in accordance with the material used for the vibration string, the creep quantities defined by $\Delta f/f_w$ of various string materials are listed in a Table shown below, where $f_w$ is a frequency increase to be finally attained and $\Delta f$ the difference between $f_w$ and a frequency increase attained just after a force increase (Refer to FIG. 6). The results are of course based on the experiments carried out under the same condition for all of the materials.

TABLE

| | String material | Creep ($\Delta f/f_w$) |
|---|---|---|
| This embodiment | Pt 92.5%-N 7.5% alloy | $2.7 \times 10^{-6}$ |
| Comparison | Stainless steel for spring | $36 \times 10^{-6}$ |
| | Berylium-copper | $25 \times 10^{-6}$ |
| | Ni-SPAN-C | $10 \times 10^{-6}$ |

The creep quantity of the embodiment of the present invention is remarkably small, as the above table shows, in comparison with those of conventional apparatuses using the vibration string made of materials other than the Pt-Ni alloy. Similar excellent results have been obtained in the Ni concentrations ranging from 5 to 15%.

The above described embodiment of the present invention can be modified to use two vibration strings, one string made thicker at the end portions than at the remaining portions, or a tuning fork type vibration system, as will be described in the following in reference to FIGS. 7 to 11. The vibration strings are, of course, made of a platinum-nickel alloy.

In FIG. 7 two parallel strings 1a and 1b are stretched between a common fixed base 2 and a common force-loading point 3. The two strings 1a and 1b are devised to vibrate with their vibration phases inverted with respect to each other. By making the vibration phases inverted with respect to each other, two horizontal forces to act on the force-loading point 3 due to the string vibrations are cancelled by each other. A possible error due to the horizontal vibration of the force-loading point 3 is thus eliminated substantially.

FIG. 8 shows another two-string system, in which a series-connection of two strings 1c and 1d with a force-loading point 3' provided therebetween is stretched between two fixed bases 2 and 2'. In this two-string system the string 1c is loaded with a force so that the string tension may increase, while the string 1d is loaded with the force so that the tension may decrease. Accordingly, the two strings 1c and 1d vibrate at their respective different frequencies. Measurement of the difference between the two vibration frequencies makes it possible to increase the resolving power of the apparatus. The above function can be given also by constituting the two-string system as shown in FIG. 9.

FIG. 10 shows a vibration string (1e) made thicker at the end portions than at the remaining portion with respect to the vibrational direction, and constituted in one body together with a fixed base 20 and a force-loading point 30. This string constitution is favorable to be securely mounted in the apparatus, but has a disadvantage that the manufacturing cost is high.

FIG. 11 shows a two-string system formed as a tuning fork. This is suitable for precision measurement and large-force measurement.

It will easily be understood from the above descriptions that, by the present invention a force detection making use of the string vibration is, for the first time, made applicable to a precision force detector. In consideration of the above result the present invention has made it possible to provide a vibration type force detector having an accuracy of $10^{-5}$.

In addition, the use of a platinum alloy for the vibration string results in an excellent stability and long durability of the apparatus. Further, the platinum alloys containing nickel in a range of 5 to 15% show large tensil strengths larger than 100 kg/mm$^2$, and therefore a wider range of vibration frequencies can be used. In other words, a maximum frequency at a full-scale loading can be chosen to be twice the frequency at zero loading. This causes the precision and resolving power to increase. In case of conventional vibration type force detector, the maximum frequency remains at 1.2 to 1.3 times the zero-loading frequency.

We claim:

1. A vibration type force detector for detecting force through measurement of the natural frequency of a vibration string made of a platinum-based alloy containing nickel and through a device to vibrate with a force to be measured arranged so as to contribute to the tension of said vibration string, said vibration type force detector comprising:

a first string-fixing means for fixing one end of said vibration string to a projection provided on a base portion of said vibration type force detector;

a second string-fixing means for fixing another end of said vibration string to one end of a force transmitting lever for transmitting said force to be measured to said vibration string so that said vibration string is given a tension proportional to said force to be measured, said first and second string-fixing means consisting of a pair of clamping pieces which are encased in a box type casing, a spring for pushing said clamping pieces vertically on a base disc having a through hole at the center thereof through which said string extends and a spring lid secured to said casing so as to keep said clamping pieces fixed to an inner wall of said casing;

a magnetic field applied to said vibration string to cause a vibrating voltage to develop across said vibration string when the string vibrates; and a positive feedback amplifier for constituting an oscillator circuit together with said vibration string so as to make said vibration string continue to vibrate at a frequency determined by the tension applied thereto.

2. A vibration type force detector for detecting force through measurement of the natural frequency of a vibration string made of a platinum-based alloy containing nickel and through a device to vibrate with a force to be measured arranged so as to contribute to the tension of said vibration string, said vibration type force detector comprising:

a first string-fixing means for fixing one end of said vibration string to a projection provided on a base portion of said vibration type force detector;

a second string-fixing means for fixing another end of said vibration string to one end of a force transmitting lever for transmitting said force to be measured to said vibration string so that said vibration string is given a tension proportional to said force to be measured, said first and second string-fixing means consisting of a pair of clamping pieces which are encased in a box type casing, a spring for pushing said clamping pieces vertically on a base disc having a through hole at the center thereof through which said string extends and a spring lid secured to said casing so as to keep said clamping pieces fixed to an inner wall of said casing;

a magnetic field applied to said vibration string to cause a vibrating voltage to develop across said vibration string when the string vibrates;

a positive feedback amplifier for constituting an oscillator circuit together with said vibration string so as to make said vibration string continue to vibrate at a frequency determined by the tension applied thereto; and a lever clamp means for clamping said force transmitting lever, said clamp means consisting of a screw bolt which is screwed into a female screw hole provided in said base portion of said vibration type force detector through a through hole provided in said force transmitting lever.

* * * * *